(12) United States Patent
Adams

(10) Patent No.: US 6,409,195 B1
(45) Date of Patent: Jun. 25, 2002

(54) HANDCRANKED REAR-WHEEL AXLE-DRIVEN SPORT WHEELCHAIR

(76) Inventor: Robert Joss Adams, 1907 Barton Hills Dr., Austin, TX (US) 78704

( * ) Notice: Subject to any disclaimer, the term of this patent is extended or adjusted under 35 U.S.C. 154(b) by 0 days.

(21) Appl. No.: 09/808,563

(22) Filed: Mar. 14, 2001

(51) Int. Cl.$^7$ ................................................. B62M 1/14
(52) U.S. Cl. ...................................... 280/250; 280/282
(58) Field of Search ............................. 280/242.1, 249, 280/250, 282, 250.1

(56) References Cited

U.S. PATENT DOCUMENTS

| | | | |
|---|---|---|---|
| 2,403,217 A | * 7/1946 | Hale ........................... | 280/250 |
| 3,848,891 A | * 11/1974 | Vittori ....................... | 280/242.1 |
| 4,274,651 A | 6/1981 | Dumont ............... | 280/242 WC |
| 4,316,616 A | 2/1982 | Boivin ................ | 280/289 WC |
| 4,758,013 A | 7/1988 | Agrillo ................ | 280/242 WC |
| 5,465,989 A | 11/1995 | Grove ........................ | 280/250 |
| 5,501,480 A | 3/1996 | Ordelman et al. ....... | 280/304.1 |
| 5,873,589 A | 2/1999 | Hallett .................... | 280/250.1 |
| 6,070,894 A | * 6/2000 | Augspurger ................ | 280/249 |
| 6,193,253 B1 | * 2/2001 | Barnett ...................... | 280/234 |
| 2001/0042968 A1 | * 11/2001 | Andrews et al. ........... | 280/220 |

FOREIGN PATENT DOCUMENTS

FR  2682660 A1 * 4/1993 ............ B62M/1/04

* cited by examiner

Primary Examiner—Kevin Hurley
(74) Attorney, Agent, or Firm—Baker Botts L.L.P.

(57) ABSTRACT

A sport type wheelchair. The wheelchair has two rear wheels and a front wheel. A handcrank and a sprocket and chain mechanism provide rear wheel axle chain drive. The steering is front wheel steering, operated with a steering handle attached to the front wheel.

13 Claims, 4 Drawing Sheets

HANDCRANKED REAR-WHEEL AXLE-DRIVEN SPORT WHEELCHAIR

TECHNICAL FIELD OF THE INVENTION

This invention relates to manually operated cycle-type transport devices, and more particularly to a handcrank wheelchair.

BACKGROUND OF THE INVENTION

Racing type wheelchairs, sometimes called hand cycles, have been designed for persons who lack use of their legs. These wheelchairs often have a three wheel design, with two wheels in back and a third wheel in front. The driver sits in a seat between the front and rear wheels.

Conventional racing wheelchairs are operated in a manner similar to "street" type wheelchairs, by pushing on the top of a circular rail outside the rear wheels. Steering is accomplished by turning a steering handle connected to a front wheel.

Alternative wheelchair designs, for both racing and non racing wheelchairs, have attempted to use handcranks to activate the rear wheels. U.S. Pat. No. 4,274,651, to Dumont, entitled "Wheelchair", describes a two-wheeled wheelchair of this type. U.S. Pat. No. 4,758,013, to Agrillo, describes a three-wheeled handcrank wheel chair. Each of these patents describes a hand crank and chain drive assembly associated with each rear wheel. Steering is accomplished by independently rotating the rear wheels.

SUMMARY OF THE INVENTION

One aspect of the invention is a sport wheelchair, having a frame tube, a pair of rear wheels, and a single front wheel. A rear axle connects the rear wheels to each other, using struts to support the rear wheels under the frame tube.

A front fork connects the front wheel to the frame tube, such that the front wheel may turn relative to the frame tube for steering. The seat is attached to the frame tube between the front tire and the rear tires. The wheelchair is driven with a handcrank assembly in front of the seat, having a handcrank axle rotatably connected to the frame tube and having a handcrank rigidly attached to each end of the handcrank axle. A steering handle extends generally upwardly from the front fork, and is operable to change the direction of the front wheel. A gearing mechanism has a front sprocket operable to turn in response to rotation of the handcrank axle, at least one rear sprocket operable to turn the rear axle, and a chain connecting the front and rear sprockets. Derailer type gearing, as well as braking, can be implemented in a manner similar to mechanisms used on conventional bicycles.

An advantage of the invention is that it is designed to make the best use of the driver's upper body strength. The motion is efficient, and at the same time, gears and other active mechanism are placed safely out of the way of the driver.

DETAILED DESCRIPTION OF THE INVENTION

Figure 1:
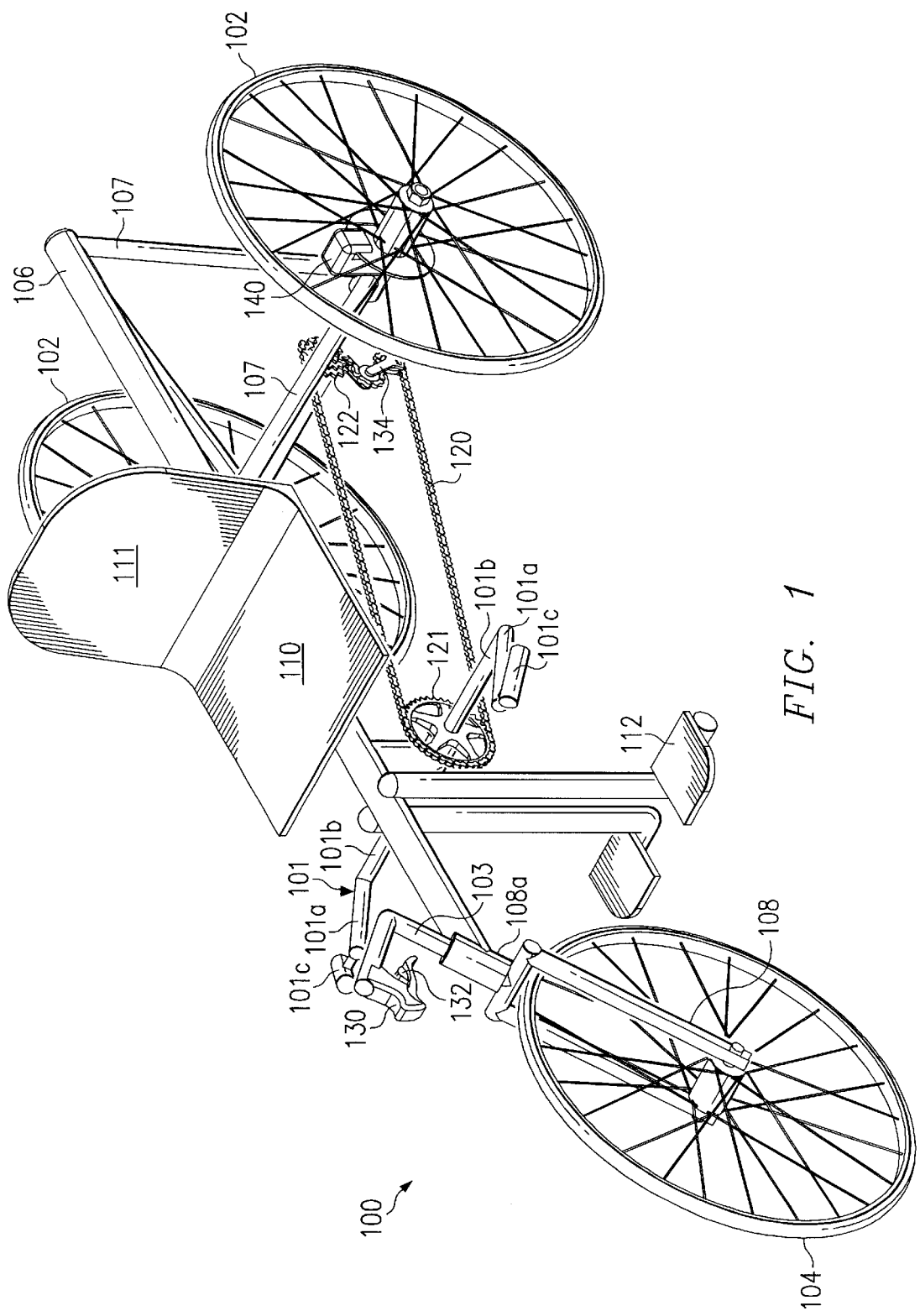
FIGS. 1 and 2 are perspective views of a sport wheelchair in accordance with the invention.
Figure 2:
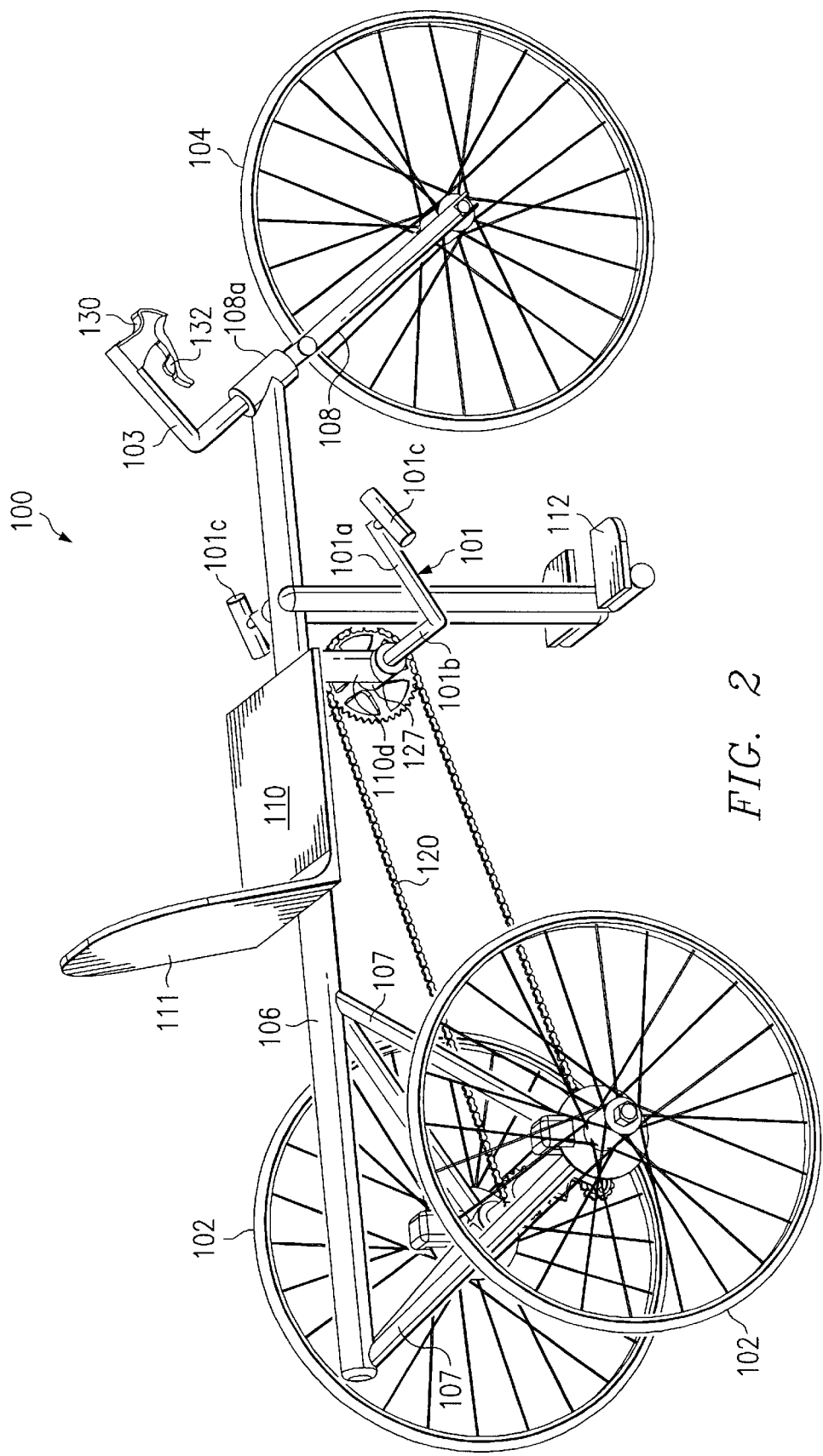
Figure 3:
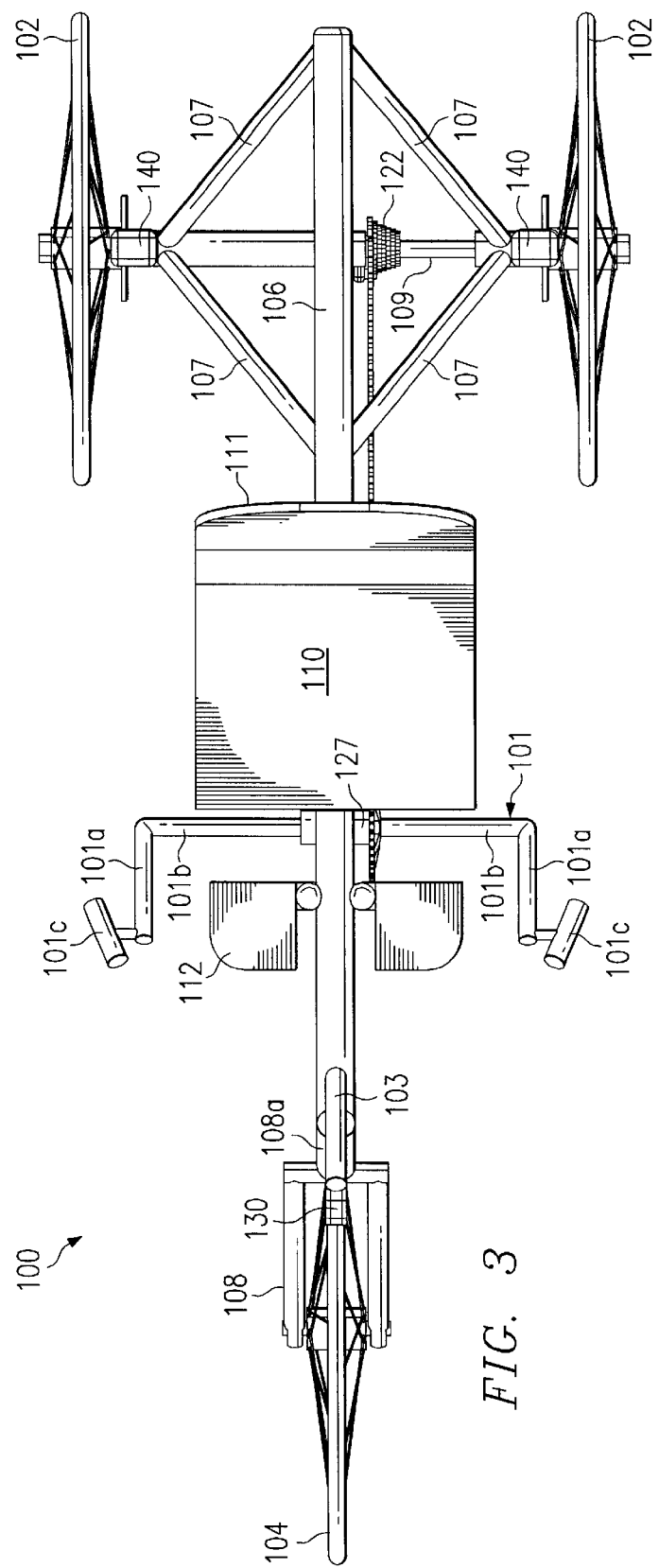
FIG. 3 is a top view of the wheelchair of FIGS. 1 and 2.
Figure 4:
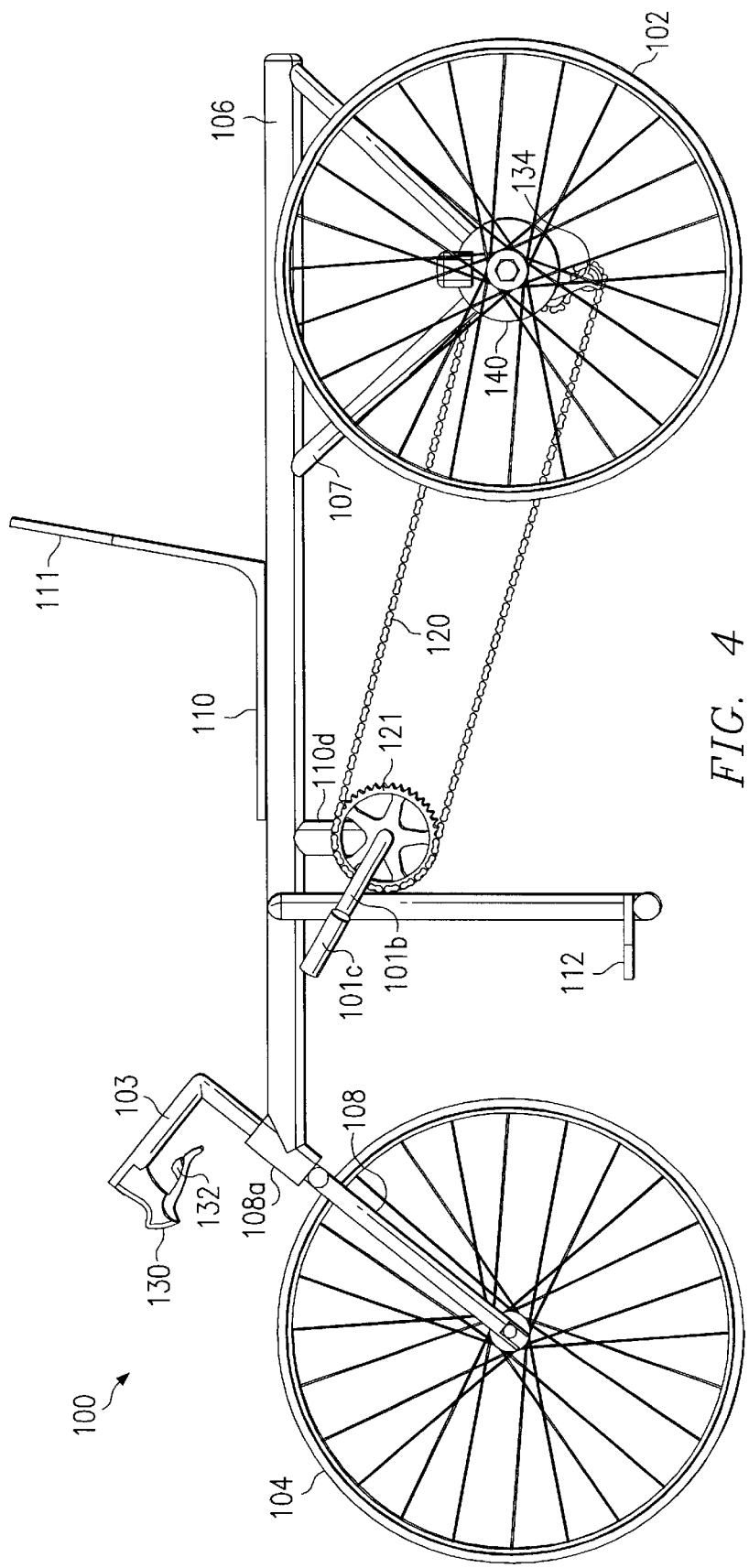
FIG. 4 is a side view of the wheelchair of FIGS. 1 and 2.

FIGS. 1 and 2 are perspective views of a wheelchair 100 in accordance with the invention. FIG. 3 is top view, and FIG. 4 is a side view of wheelchair 100.

Wheelchair 100 is designed for use by persons such as paraplegics, who have lost use of their legs. Wheelchair 100 is designed primarily for racing and exercise activities, but is not limited to such use.

As explained below, wheelchair 100 is a "rear wheel axle chain drive" machine, having a handcrank 101 that propels the rear wheels 102. Steering is accomplished with a steering handle 103 that controls the direction of the front wheel 104.

The frame of wheelchair 100 comprises a frame tube 106, struts 107, and fork 108. Frame tube 106 is generally horizontal to the surface upon which wheelchair 100 is to be operated.

Struts 107 are rigidly attached to frame tube 106 and provide means for attachment of a rear wheel assembly, which has two rear wheels 102 and a rear axle 109. There are two struts for each rear wheel 102, thus, wheelchair 100 has a total of four struts 102. At each end of rear axle 109, two struts extend diagonally to frame tube 106, such that the two struts form an upside down "V" shape, with the apex attached to rear axle 109 inside a rear wheel 102. The point of attachment of each pair of struts 107 to rear axle 109 may be anywhere between the midpoint of rear axle 109 and the associated rear wheel 102. Other strut configurations are possible; in some designs, a single strut 107 associated with each rear wheel 102 may be possible.

Fork 108 is also attached to frame tube 106. For steering purposes, the attachment of fork 108 to frame tube 106 permits fork 108 to rotate from side to side. Like a conventional bicycle, fork 108 permits front wheel 104 to turn relative to frame tube 106. For example, fork 108 may extend through a fork tube 108a at the front of frame tube 106. Fork 108 provides a means for attachment of front wheel 105.

The various frame elements of wheelchair 100 are made from a strong rigid material, such as metal. Typically, they are made from a tubular material. Ideally, the material should be lightweight without unduly compromising strength. Variations of wheelchair 100 include designs that are especially streamlined and lightweight so that wheelchair 100 is better suited for competitive racing.

Wheelchair 100 is of dimensions appropriate for carrying a human, and may be modified in size for children or adults. A typical length of frame tube 106 in a wheelchair 100 sized for adults is 40 inches. A typical length of struts 102 is 15 inches.

Front wheel 104 and rear wheels 102 may be similar to wheels used for conventional bicycles, and attached to the frame in a similar manner. For example, the attachment of front wheel 104 to fork 108 and the attachments of rear wheels 102 to rear axle 109 may be similar to that used for a bicycle. Rear wheels 104 are spaced apart on opposing ends of rear axle 109, with a typical length of rear axle 109 being 30 inches. The wheels 102 and 104 may be spoke type wheels or they may have solid rims. Typically, wheels 102 and 104 have rubber tires.

A typical size of wheels 102 and 104 is 27 inches in diameter. An example of a suitable tire is a 700×23 c type bicycle tire. In FIGS. 1–4, front wheel 104 is substantially the same size as rear wheels 102. In other embodiments, front wheel 104 could be smaller than rear wheels 102.

A seat 110 and backrest 111 are attached to frame tube 106 between rear wheels 102 and front wheel 104. The location of seat 110 on frame tube 106 is generally at the mid point of frame tube 1906, but may be adjusted to optimize balance and propulsion. For example, seat 110 may be placed slightly behind the midpoint of frame tube 106, more over rear wheels 102 so long as front to rear balance of wheelchair 100 is not compromised when the driver is seated. In general, seat 110 is located such that the driver's center of gravity is ahead of and above the rear wheels 102.

A pair of footrests 112 is attached to frame tube 101, each extending downwardly under seat 110. Alternatively, footrests 112 could be attached to seat 100.

In FIGS. 1–4, the seat 100 and footrests 112 place the driver in a standard sitting position, as in a straight backed chair, but other positions are possible. Seat 110 and backrest 111 may be made independently adjustable, to tilt more forward or back as desired by the driver.

Handcrank assembly 101 comprises a pair of handcranks 101a and a handcrank axle. A handcrank 101a is attached to each end of a handcrank axle 101b. Handcrank axle 101b is rotatably attached to frame tube 106, orthogonal to frame tube 106, at a location between front wheel 104 and seat 110. The rotatable attachment of handcrank axle 101b to frame tube 106 may be accomplished by various means. For example, a holding tube 127 having a diameter slightly larger than handcrank axle 101b could be welded to frame tube 106. Bearing mechanisms (not shown) may be used as an interface between handcrank axle 110b and the means for attachment to frame tube 106 to facilitate rotation of handcrank axle 110b.

The place of attachment of handcrank axle 101b along frame tube 106 is suitable to permit the driver of wheelchair 100 to comfortably rotate handcranks 101a while seated in seat 110. Typically, this attachment will be at some point just in front of seat 110. Ideally, handcrank axle 101b is below and to the front of the driver's center of gravity, for maximum propulsion. If desired, handcrank axle 101b can be dropped below front tube 106, such as by being attached to a short drop bar 110d connected at one end to frame tube 106 and at the other end to handcrank axle 101b. Handcrank axle 101b has a typical length of about 22 inches.

Handcranks 101a are rigidly attached to handcrank axle 101b, such that handcrank axle 101b rotates in response to rotation of handcranks 101a. In other words, handcranks 110a rotate dependently. The rotation of handcranks 101a is in the direction indicated in FIG. 2. This rotation is translated to front sprocket 121, thereby providing the driving force for rear wheels 102.

As illustrated, each handcrank 101a may have a special grip 101c for comfortable gripping and pushing during operation of wheelchair 100. For this embodiment, a typical length of each handcrank 101a is 7 inches, with each grip 101c being approximately 4 inches in length.

A chain 120, a front sprocket 121, and a rear sprocket 122 provide the driving connection between the handcrank axle 109 and the rear wheel axle 109. Handcrank axle 110b runs through the center of front sprocket 121, typically at some point near the midpoint of handcrank axle 101b. Rear axle 109 runs through the center of rear sprocket 122 between rear wheels 102, typically at the midpoint of rear axle 109. Chain 120 encircles both sprockets 121 and 122 and extends the distance between them. Thus, when handcranks 101a are rotated, the rotation is translated to rear wheels 102.

Front sprocket 121 is large relative to rear sprocket 122, with gearing ratio suitable for upper-body-driven propulsion. An example of a suitable gear ratio for a single pair of sprockets is 1:1.5. As explained below, however, a feature of the invention is the ease with which additional sprockets and derailer gearing may be added.

As stated above, wheelchair 100 has front wheel steering, controlled by a steering handle 103. The driver turns steering handle 103 in the desired direction of travel. Steering handle 103 is rigidly attached to front fork 108, which as stated above, is rotatably attached to frame tube 106, such that front wheel 104 may turn. Thus, a turning motion of steering handle 103 translates to front wheel 104. In the embodiment of FIGS. 1–4, steering handle 103 is an angled bar, which extends upwardly from front fork 108 for a distance then angles away from the driver. Various other configurations are possible, depending on the desired ergometrics.

Steering is designed so that once the driver turns steering handle 103 to a particular position, it will hold that position. This permits wheelchair 100 to hold a line of direction until the driver re-positions the steering handle 103. This may be accomplished by various means. For example, the attachment of front fork 108 within fork tube 108a could be sufficiently stiff so that there is minimal play in the movement of front fork 108 within fork tube 108a. Screw type threading, or other means, could be fabricated on the outer surface of steering handle 103 and the inner surface of fork tube 108a to provide the desired steering stiffness.

If desired, derailer type gearing may be added to provide different gears. A gear shift lever 132 is located on steering handle 103, and a cable (not shown) used to attach the shift lever 132 to the derailer 134. As illustrated, the gearing is placed at the rear axle 109, below and behind the driver. The derailer type of gear shifting can be implemented in a manner similar to that used for bicycles. The addition of derailer gearing would be accompanied by the addition of more sprockets (not shown) having various sizes for different gearing ratios. Front gearing in addition to, or alternative to, rear gearing, could be implemented. [IS THE LAST SENTENCE TRUE?]

Braking may be provided by adding an actuator 130 to steering handle 103. Actuator 130 provides tension on a brake cable (not shown), which operates a brake caliper and disc mechanism 140 at one of the rear wheels 102. As illustrated in FIG. 3, the braking mechanism 140 may be located on one side or the other of one of the rear wheels 102. This type of braking can be implemented in a manner similar to that used for bicycles. Other braking systems, such as drum brakes, could also be implemented, and the brakes could be dual brakes, at more than one wheel.

In operation, each handcrank 101a rotates complete cycles in succession. The hands of the driver of wheelchair 100 may remain on handcranks 101a during the complete cycle. This mode of operation is designed to make efficient use of the arm, chest, and shoulder muscles. The driver may remove one hand from handcrank 101a when desired to operate steering handle 103 or the gear lever or brake actuator mounted thereon.

Other Embodiments

Although the present invention has been described in detail, it should be understood that various changes, substitutions, and alterations can be made hereto without departing from the spirit and scope of the invention as defined by the appended claims.

What is claimed is:

1. A sport wheelchair, comprising:

a frame tube;

a pair of rear wheels;

a single front wheel;

a rear axle that connects the rear wheels to each other;

a plurality of struts, at least one associated with each rear wheel, for connecting the rear axle to the frame tube;

a front fork that connects the front wheel to the frame tube, such that the front wheel may turn relative to the frame tube;

a seat attached to the frame tube between the front tire and the rear tires;

a handcrank assembly in front of the seat, having a handcrank axle rotatably connected to the frame tube and having a handcrank rigidly attached to each end of the handcrank axle;

a steering handle extending generally upwardly from the front fork, operable to change the direction of the front wheel; and a gearing mechanism having a front sprocket operable to turn in response to rotation of the handcrank axle, at least one rear sprocket operable to turn the rear axle, and a chain connecting the front and rear sprockets.

2. The wheelchair of claim 1, further comprising a braking mechanism at one wheel and a brake actuator mounted on the steering post.

3. The wheelchair of claim 2, wherein the braking mechanism is a disc brake mechanism.

4. The wheelchair of claim 2, wherein the braking mechanism is at a rear wheel.

5. The wheelchair of claim 1, further comprising additional sprockets, a derailer for shifting, and a gear shift lever mounted on the steering handle.

6. The wheelchair of claim 1, wherein the front wheel is substantially the same size as the rear wheels.

7. The wheelchair of claim 1, further comprising footrests extending downwardly from the frame tube.

8. The wheelchair of claim 1, wherein the top portion of the steering post is angled away from the seat.

9. The wheelchair of claim 1, wherein the wheels are rubber rimmed spoked tires.

10. The wheelchair of claim 1, wherein the front fork is attached to the frame tube by means of a fork tube.

11. The wheelchair of claim 1, wherein the handcrank axle is attached to the frame tube by means of an axle tube.

12. The wheelchair of claim 1, wherein the handcrank axle is attached to the frame tube by means of a drop bar.

13. The wheelchair of claim 1, wherein the seat is positioned such that the driver's center of gravity is above the rear wheels.

* * * * *